United States Patent [19]

Leyens et al.

[11] Patent Number: 5,076,775
[45] Date of Patent: Dec. 31, 1991

[54] DEVICE FOR PRODUCTION OF A CONTINUOUS PLASTIC SHEET BY CASTING IN THE LIQUID STATE ON A MOBILE SUPPORT COMPRISING JUXTAPOSED GLASS PLATES

[75] Inventors: Gerd Leyens, Aachen; Siegfried Pikhard, Roetgen; Norbert Bartonitschek, Stolberg, all of Fed. Rep. of Germany; Daniel Martin, Compiegne; René G. Poix, Noyon, both of France

[73] Assignee: Saint-Gobain Vitrage International, Courbevoie, France

[21] Appl. No.: 532,680

[22] Filed: Jun. 4, 1990

[30] Foreign Application Priority Data

Jun. 8, 1989 [FR] France .................. 89 07594

[51] Int. Cl.$^5$ .............................. B28B 7/36
[52] U.S. Cl. .................. 425/89; 156/304.3; 264/166; 264/DIG. 45; 425/174.8 E; 425/182; 425/224; 427/169
[58] Field of Search .......... 425/89, 101, 113, 115, 425/182, 174.8 E, 224, 447; 156/304.3; 427/169; 264/166, DIG. 45

[56] References Cited

U.S. PATENT DOCUMENTS

| | | | |
|---|---|---|---|
| 3,274,302 | 9/1966 | Anderson et al. | 425/174.8 E |
| 4,017,575 | 4/1977 | Heyer | 425/174.8 E |
| 4,136,214 | 1/1979 | Bourelier et al. | 427/169 |
| 4,235,655 | 11/1980 | De Roeck et al. | 156/304.3 |
| 4,309,368 | 1/1982 | Groves | 425/174.8 E |
| 4,310,294 | 1/1982 | De Geest et al. | 425/174.8 E |

FOREIGN PATENT DOCUMENTS

| | | |
|---|---|---|
| 0001465 | 4/1979 | European Pat. Off. |
| 0298229 | 1/1989 | European Pat. Off. |
| 1333083 | 10/1973 | United Kingdom |

Primary Examiner—Jay H. Woo
Assistant Examiner—William J. Matney, Jr.
Attorney, Agent, or Firm—Oblon, Spivak, McClelland, Maier & Neustadt

[57] ABSTRACT

An apparatus for production of a continuous plastic sheet (2) includes structure for the forming of at least one layer cast in the liquid state of this plastic material, or a reaction mixture of reactive components, on a mobile support of glass plates (1) placed edge to edge and carried by a conveyor, followed by the setting of the layer formed on the surface of the glass plates and pulling off the set sheet. Strips (3) of flexible material are inserted between the adjacent glass plates. The adjacent edges of the glass plates are covered, before the casting is performed, by a ribbon (4) of a material nonadherent to the glass, which overlaps the section of the inserted strip or strips. After having been positioned on the glass plates, the ribbon is made temporarily adherent to the latter upstream from the casting in the liquid state by electrostatically charging with opposite charges the glass plates and the ribbon.

8 Claims, 2 Drawing Sheets

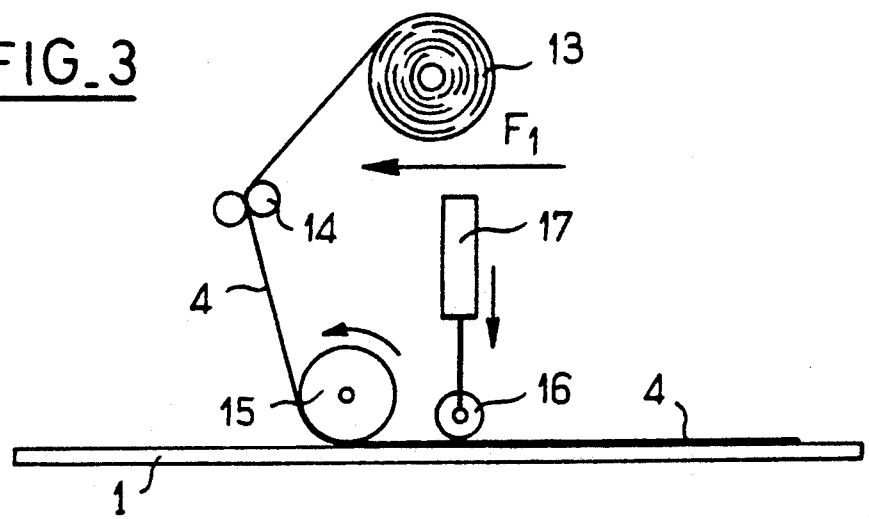
FIG_3
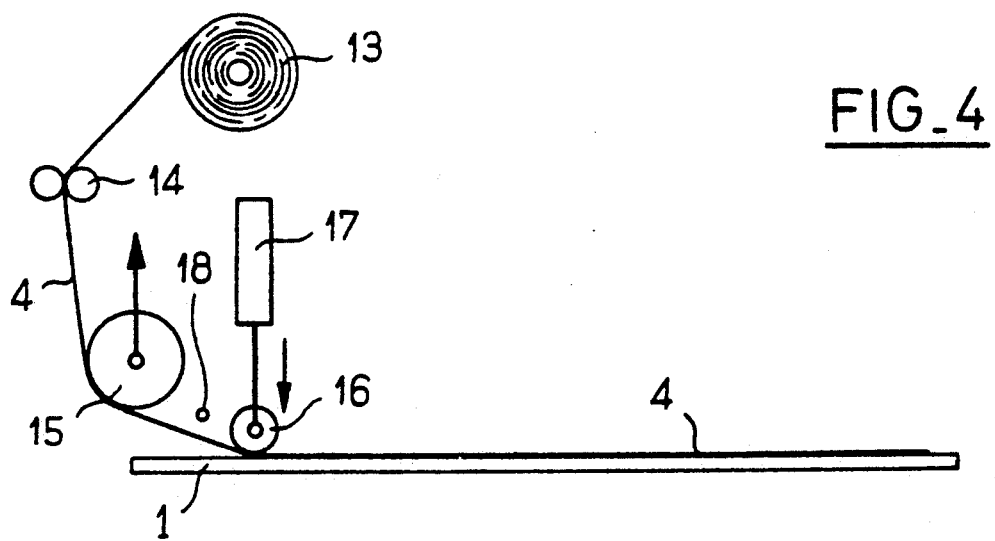
FIG_4
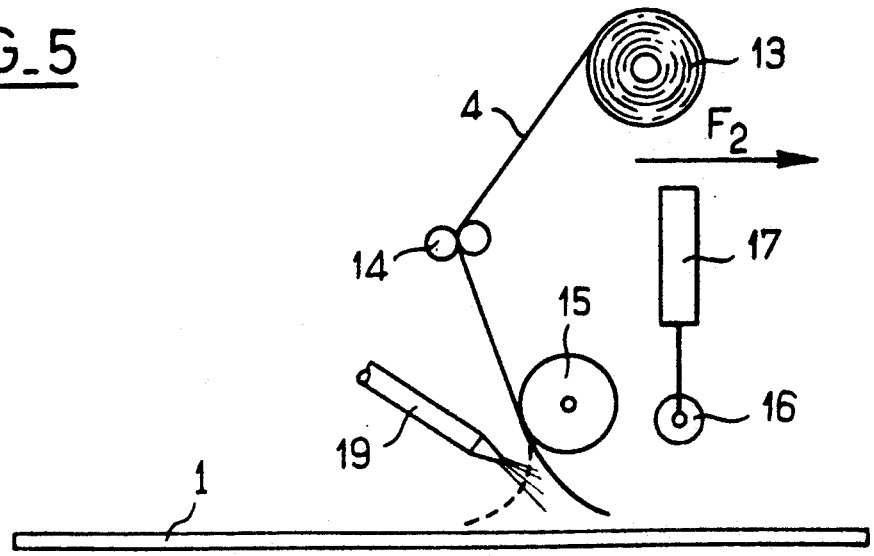
FIG_5

DEVICE FOR PRODUCTION OF A CONTINUOUS PLASTIC SHEET BY CASTING IN THE LIQUID STATE ON A MOBILE SUPPORT COMPRISING JUXTAPOSED GLASS PLATES

BACKGROUND OF THE INVENTION

1. Field of the Invention

This invention relates to a device for production of a continuous plastic sheet by casting this plastic material or a reaction mixture of reactive components leading to this material in the liquid state on a mobile support comprising glass plates placed end to end and supported by a conveying means.

2. Description of the Related Art

Such a device is described, for example, in U.S. Pat. No. 4,136,214.

The material placed in the liquid state on the mobile bottom consisting of glass plates solidifies there by cooling, is separated from the plates downstream from the device for forming a continuous sheet, which then is wound and stored in this form, to be cut later into panels of dimensions suited to the use considered.

In practice, plastic sheets which are made by such a process are intended for the production of safety glass of the asymmetrical type, formed as a rigid, monolithic or laminated support comprising, on one of its faces, a transparent plastic layer, generally consisting of a polyurethane.

These glazings may be used in a windshield. There, the plastic layer, turned toward the inside of the vehicle, has various functions:

1. To protect the passengers from lacerations by pieces of glass in case of an accident;
2. If necessary, to act as an energy absorber in case of impact.

To meet these requirements, a sheet with two distinct plastic layers generally is used, which is assembled on a rigid, monolithic or laminated glass support, the energy-absorbing layer being applied against the glass, while the scratch-resistant layer is placed inside the vehicle.

It is clear that the plastic sheets used for this purpose should have excellent optical qualities and, for this purpose, they should be cast on a continuous glass ribbon, for example a glass ribbon which was just formed by floating. But this is hard to achieve in practice. Therefore, in practice a train of glass sheets of a constant thickness are placed edge to edge on a continuous conveyor and are used for a continuous bottom for casting of the reaction mixture. These glass sheets are used only as a support for the forming of the plastic sheet, and they generally are first coated with a separating agent intended to prevent adherence of the plastic to the glass and to facilitate the separation of the two after setting.

To protect the sections of the glass plates during this process, by preventing their mutual rubbing, and to prevent the penetration of the liquid plastic between the adjacent edges, it has been proposed to insert an elastic strip, for example, a foam strip, between the glass plates.

However, this solution presents the drawback that the cast plastic material changes the characteristics of the inserted foam strip so that if the glass plates are reused for a new cycle of casting, as is usually the case, it is necessary to replace the flexible elastic strips by new strips.

To prevent this change of the inserted strips, they may be protected by an adhesive ribbon glued to the adjacent edges of two successive plates and overlapping or covering the inserted strip. Unfortunately, this solution is not satisfactory, because the adhesive ribbon adheres firmly not only to the glass but also to the plastic which covers it and the subsequent pulling off of the sheet is made difficult, with the risk of tearing the latter.

SUMMARY OF THE INVENTION

This invention has as an object to eliminate this drawback by the use of a normally nonadhesive ribbon, which is made to electrostatically adhere to the glass plates only at the time of the forming of the plastic sheet.

Another object of this invention therefore is, in a device for production of a continuous plastic sheet comprising at least one layer obtained by casting plastic in the liquid state, or a reaction mixture of reactive components, on the surface of a mobile support consisting of a train of glass plates placed edge to edge to facilitate, after the setting of the layer, the pulling off of the sheet and the protective ribbon which overlaps the continuous edges of the glass plates while protecting the inserted strips inserted between the latter.

Another object of the invention is to use a normally nonadhesive protective ribbon, which is made momentarily adherent to the glass plates only just before the casting of plastic and whose temporary adherence then disappears spontaneously.

The invention also has as its object a device of this type in which the strips of flexible material inserted between the adjacent sections of the glass plates can be reused for several successive production cycles, after pulling off the set plastic sheet.

The invention finally has as its object an apparatus which uses only means known separately in the art and which therefore is simple and easy to use.

The invention comprises a conveying means able to carry the glass plates placed edge to edge, with at least one inserted strip of a flexible material placed between their adjacent edges, means for casting in the liquid state plastic or a precursor reaction mixture of this plastic on a surface of said glass plates, means for positioning on said surface at the edges of two plates a protective ribbon which overlaps the inserted strip separating them, and which adheres to the adjacent edges of the glass plates. Upstream from the casting means, in the direction of displacement of the glass plates, are provided means able to charge with electrical charges of opposite signs the glass plates and the ribbon placed on these plates to make a ribbon normally nonadherent to the glass plates temporarily adherent to said surface of the latter.

Advantageously, the means for placing the ribbon will comprise a moving apparatus comprising a reel of the ribbon, a calendering roller able to apply this ribbon against the outside face of the glass plates, perpendicular to their direction of displacement, and a means for cutting said ribbon.

The ribbon used for the invention can be a plastic such as a polyester, and the cutting means then can be simply a hot wire.

To prevent the ribbon from unrolling freely from the reel, the latter advantageously will be equipped with a powder electromagnetic brake.

To assure a correct placing of the protective ribbon on the glass sheets, the moving apparatus preferably will comprise a small padded wheel pressing on the ribbon.

The means able to charge with charges of opposite signs the glass plates and the ribbon laid on the latter advantageously will comprise at least two ionizing bars, placed respectively on opposite vertical sides of the horizontally oriented glass plates, i.e., above and below the glass plates, crosswise to their direction of displacement, and able to create an electrostatic field so that positive ions are produced above the ribbon, while negative ions are produced below the glass. The protective ribbon placed on the glass thus will charge positively and therefore will adhere to the glass support, which will be charged negatively.

Such ionizing bars are well known in the art and operate under relatively high voltages on the order of 6 to 9 kV. They therefore make it possible to make the ribbons, which protect the edges of the flexible material separating the adjacent glass plates, temporarily integral with the glass plates. After setting of the plastic sheet placed on the glass plates, the former can be pulled off the protective ribbons without interfering with the inserted strips which separate the glass plates and which thus can be reused for new production cycles.

It will be noted that the electrostatic charges naturally dissipate at the time of the casting of the plastic and its setting, without it being necessary to use any specific means for this purpose.

BRIEF DESCRIPTION OF THE DRAWINGS

Other characteristics and advantages of the invention will come out in the following detailed description of an embodiment of the invention. In this description, reference will be made to the accompanying drawings, given by way of nonlimiting example and in which:

FIGS. 3, 4 and 5 are schematic views illustrating three phases of the laying of the protective ribbon on the glass plates.

DETAILED DESCRIPTION OF THE PREFERRED EMBODIMENTS

Figure 1:
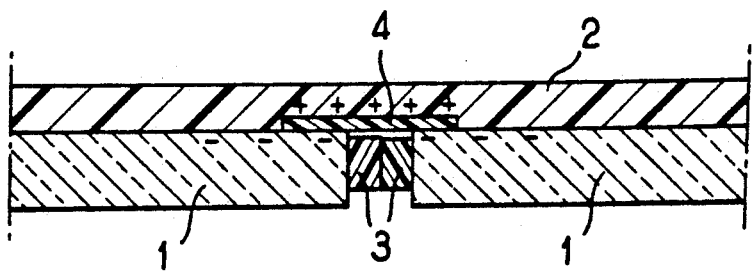
FIG. 1 is a partial sectional view in lateral elevation of two adjacent glass plates, illustrating the principle of the invention.

FIG. 1 shows the relative positions of two glass plates 1 placed edge to edge and used for support of a plastic layer 2 which has been cast on these plates. Between the latter are inserted, for example, one or two strips 3 of a flexible material, for example, of foam. To isolate strips 3 from plastic layer 2, a ribbon 4, for example of polyester, rests on the adjacent edges of plates 1 and overlaps or covers strips 3.

According to the invention, ribbon 4 does not adhere spontaneously to plates 1, but has been caused to adhere there electrostatically before casting the plastic, by creating an ionizing field between ribbon 4 and plates 1, so as to charge the ribbon positively and plates 1 negatively.

Figure 2:
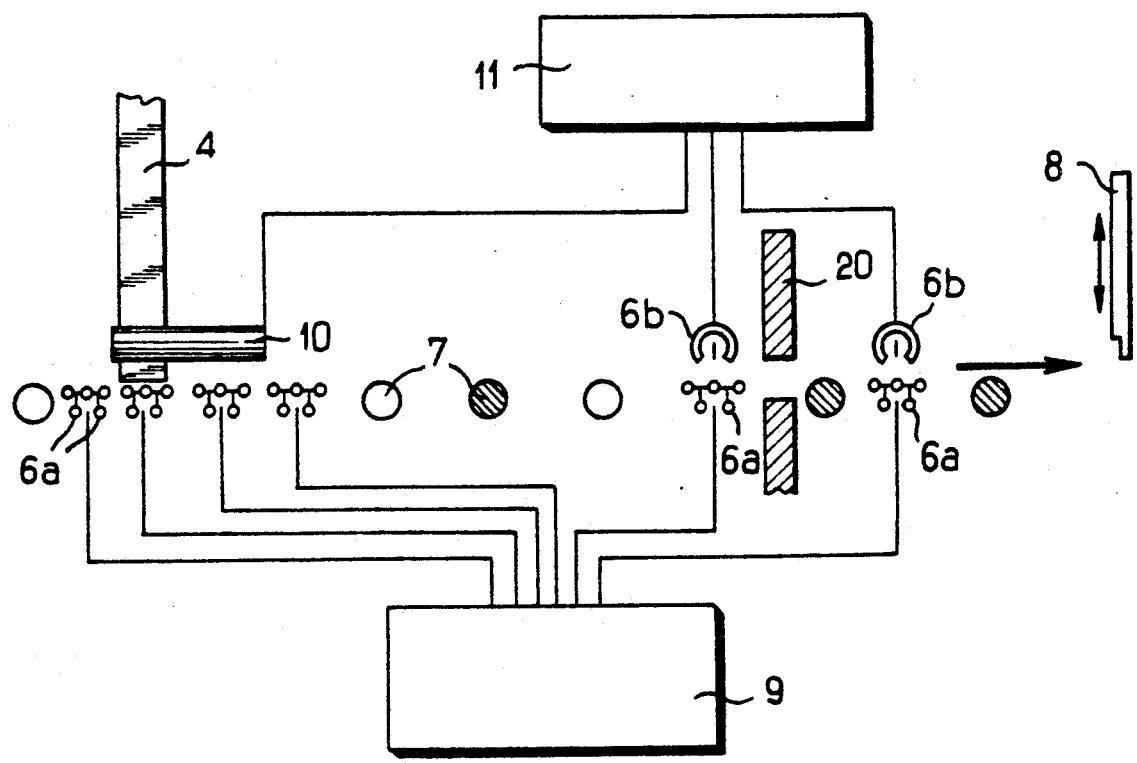
FIG. 2 is a schematic view illustrating the installing of ionizing bars.

As shown in FIG. 2, the above is achieved by placing ionizing bars 6a and 6b on respective opposite sides of the glass plates, between the rollers 7 for conveying the latter in the direction of the arrow, upstream from the casting head 8 by which the liquid plastic or the reaction mixture carrying this plastic is placed on the plates. Negative ionizing bars 6a are placed below the glass plates and are six in number, in the embodiment of the drawing. They have a useful length equal to the width of the glass plates and are fed by a high voltage generator 9 with a voltage of 6.5 or 8 Kv. Four of the bars 6a are placed adjacent one another below the path of a mobile carriage 10 for laying the ribbon 4. The carriage 10, as will be described below, moves with the glass plates while laying the ribbon, and then returns to its starting position for a new cycle. The carriage 10 itself carries a positive ionizing bar 6b (not shown) of a length smaller—because it is mobile—than bars 6a, and fed at a voltage of 24 Kv from a high voltage generator 11. A second positive ionizing bar 6b of useful length similar to that of bars 6a is placed immediately upstream from box 20 where the heat regulation of the casting support is performed, straight above a negative ionizing bar 6a, and a third positive ionizing bar 6b is placed immediately upstream from casting head 8, also straight above a negative ionizing bar 6a.

The laying of protective ribbon 4 on the edge of adjacent glass plates 1 is illustrated by FIGS. 3 to 5. A moving apparatus is carried by a carriage 10 movable in a plane parallel to the glass plates and able to be displaced in synchronism with the latter, while the moving apparatus is movable on the carriage 10 in a direction crosswise to the direction of movement of the glass plates for the placing of the ribbon while the glass plates advance continuously, and then to return in the opposite direction to its starting position.

The moving apparatus comprises a reel 13, carrying a coiled ribbon, from which ribbon 4 is unrolled. After having passed between return rollers 14, it is applied against the transverse edges of plates 1 by a vertically mobile roller 15, and it is held applied against the plates by a padded roller 16, controlled by a cylinder 17. A cutting means such as a hot wire is provided at 18 to cut the ribbon, when a sufficient length has been placed.

The moving apparatus is displaced as a unit on the carriage 10 along arrow $F_1$, perpendicular to the direction of the movement of the glass plates, during the phase of laying the ribbon 4. When a sufficient length of the latter has been placed and separated from the remainder of the coil, rollers 15 and 16 are lifted and the moving apparatus returns to its starting position by moving in the opposite direction, along arrow $F_2$, while the carriage also returns to its starting position, i.e., in a direction parallel to the direction of movement of the sheets.

Advantageously, a nozzle fed by compressed air is provided on the carriage at 19 to blow in the direction of arrow $F_2$ on the free end of unrolled ribbon 4 (FIG. 5), in order to bring the latter to a suitable position for a new cycle for laying the ribbon.

The ribbon used can be of polyester, for example that marketed under the name HOSTAPHAN. It can have a width of 50 mm and a thickness of 23, 36 or 50 microns, depending on the application.

To keep ribbon 4 taut and to control the unwinding of the coil, reel 13 advantageously will be equipped with a braking means, for example, a powder electromagnetic brake.

The invention therefore provides a means simple and easy to use to make a protective ribbon temporarily integral with two glass plates placed edge to edge and intended to form a mobile bottom for casting a continuous plastic layer, so as to protect with this plastic a seal of flexible material inserted between the plates and to make possible the reuse of the plates with the same seal.

Obviously, numerous modifications and variations of the present invention are possible in light of the above teachings. It is therefore to be understood that within the scope of the append claims, the invention may be practiced otherwise than as specifically described herein.

What is claimed as new and desired to be secured by Letters Patent of the United States is:

1. An apparatus for producing a continuous plastic sheet, comprising:

a conveyor carrying glass plates placed edge to edge, and with at least one strip of a flexible material placed between the adjacent edges of the glass plates, in a conveying direction;

means for casting a liquid plastic material on a reaction mixture which is a precursor to a plastic material on a surface of the glass plates;

a ribbon for protecting said at least one strip; and means for positioning on said surface, at a location which is both upstream of said casting means in said conveying direction and on the adjacent edges of said glass plates, said protective ribbon which covers said at least one strip; and means for electrostatically charging each of said ribbons and said glass plates such that said ribbons electrostatically adhere to said surface of said glass plates when said ribbons reach said casting means.

2. The apparatus of claim 1, wherein said conveyor extends horizontally and said means for charging comprises:

at least one positive ionizing bar positioned on one vertical side of said conveyor upstream from said casting means and extending transverse to the conveying direction;

at least one negative ionizing bar positioned on another vertical side of said conveyor upstream from said casting means and extending traverse to the conveying direction; and means for charging said ionizing bars.

3. The apparatus of Claim 2, wherein said means for positioning comprises a moving apparatus including:

a reel of the ribbon;

a calendering roller for applying the ribbon against the glass plates;

means for cutting the ribbon; and a padded wheel pressing the ribbon onto the glass plates, wherein said moving apparatus is mounted for movement in a direction transverse to the conveying direction on a carriage movable in the conveying direction.

4. The apparatus of Claim 3, wherein said cutting means is a hot wire.

5. The apparatus of Claim 3, wherein said moving apparatus includes one of said ionizing bars.

6. The apparatus of Claim 3, wherein at least some of said ionizing bars are positioned directly below a path of movement of said moving apparatus.

7. The apparatus of Claim 2, wherein at least one of said ionizing bars is positioned immediately upstream from said casting means.

8. The apparatus of claim 1, wherein said ribbon comprises a plastic ribbon.

* * * * *